United States Patent [19]

Radomski

[11] Patent Number: 4,616,162
[45] Date of Patent: Oct. 7, 1986

[54] SPEED SELECTION CONTROL FOR VEHICLE MOUNTED ELECTRIC ACCESSORY MOTOR

[75] Inventor: Thomas A. Radomski, Utica, Mich.

[73] Assignee: General Motors Corporation, Detroit, Mich.

[21] Appl. No.: 712,785

[22] Filed: Mar. 18, 1985

[51] Int. Cl.[4] .................... H02P 5/00; H02P 11/00
[52] U.S. Cl. ................... 318/317; 318/345 R; 318/345 C; 318/345 G; 318/139; 318/305; 322/28; 307/10 R
[58] Field of Search .............. 318/140, 141, 143, 144, 318/145, 146, 147, 148, 151, 152, 153, 154, 156, 157, 158, 345 C, 345 D, 345 F, 345 G, 345 H, 345 R, 317, 139, 257, 305; 322/28, 29, 32, 89, 90; 363/135, 136, 137; 307/10 R

[56] References Cited

U.S. PATENT DOCUMENTS

| | | | |
|---|---|---|---|
| 3,105,932 | 10/1963 | Burson | 322/90 |
| 3,244,900 | 4/1966 | Colvill | 307/10 |
| 3,267,353 | 8/1966 | Franklin | 322/90 |
| 3,321,697 | 5/1967 | Etter | 322/79 X |
| 3,447,065 | 5/1969 | Kuhn | 322/32 X |
| 3,467,853 | 9/1969 | Harland, Jr. et al. | 322/28 |
| 3,477,015 | 11/1969 | Kuhn | 322/28 X |
| 3,551,685 | 12/1970 | Carry | 290/14 |
| 3,568,041 | 3/1971 | Arakane | 322/28 |
| 3,588,663 | 6/1971 | Hirata | 322/28 X |
| 3,597,654 | 8/1971 | Harland, Jr. | 317/13 B |
| 3,612,969 | 10/1971 | Cockroft | 318/305 X |
| 3,668,514 | 6/1972 | Peck | 322/28 |
| 3,710,226 | 1/1973 | Seike | 320/15 |
| 3,805,144 | 4/1974 | McSparran | 322/79 X |
| 3,815,001 | 6/1974 | Jamieson | 318/305 X |
| 3,889,127 | 6/1975 | Shibata | 318/139 X |
| 3,899,731 | 8/1975 | Smith | 322/28 |
| 3,930,189 | 12/1975 | Smith | 318/144 X |
| 3,997,822 | 12/1976 | Logston, Jr. et al. | 318/52 |
| 4,150,324 | 4/1979 | Naito | 318/345 F X |
| 4,153,869 | 5/1979 | Ragaly | 322/90 |
| 4,163,181 | 7/1979 | Farber | 318/305 X |
| 4,177,415 | 12/1979 | Yukawa | 322/28 |
| 4,284,934 | 8/1981 | Narita et al. | 318/345 C |
| 4,339,704 | 7/1982 | McSparran et al. | 322/90 |
| 4,415,848 | 11/1983 | Morishita | 322/32 X |
| 4,419,618 | 12/1983 | Gretsch | 322/7 |
| 4,442,396 | 4/1984 | Hucker | 322/28 X |
| 4,456,870 | 6/1984 | Rodari | 322/29 |
| 4,491,779 | 1/1985 | Campbell et al. | 322/90 X |

OTHER PUBLICATIONS

Semiconductor Power Circuits Handbook First Edition, Motorola Semiconductor Product, Inc.

Primary Examiner—William M. Shoop, Jr.
Assistant Examiner—Shik Luen Paul Ip
Attorney, Agent, or Firm—Robert M. Sigler

[57] ABSTRACT

A speed selection control is provided for a DC electric accessory motor having an armature winding and being mounted on a vehicle having a high reactance, multiphase alternator with a diode bridge rectifying output circuit, a battery connected across the output circuit and a voltage regulator controlling the voltage across the output circuit to a substantially constant voltage. One end of the motor armature winding is connected to the ungrounded end of the output circuit, and the other end of the motor armature winding is connected to the junctions of the diodes of each phase of the output circuit through a plurality of switched rectifiers, each having an anode connected to the other end of the motor armature winding and a cathode connected to the junction of the diodes of one phase of the output circuit. A switch control provides a continuous activation signal to selected numbers of the switched rectifiers, so that the motor armature receives electric power from the alternator in a substantially rectangular voltage wave with duty cycle determined by the number of switched rectifiers activated and thus the number of alternator phases used.

1 Claim, 2 Drawing Figures

SPEED SELECTION CONTROL FOR VEHICLE MOUNTED ELECTRIC ACCESSORY MOTOR

SUMMARY OF THE INVENTION

This invention relates to the speed control of a vehicle mounted electric accessory motor, and especially for such a motor which is to be operated selectively at only a few predetermined speeds. An example of such a motor is the motor driving an engine cooling fan in many vehicles. Such a fan rarely requires more than two or three speeds. Elaborate chopper circuits capable of continuous speed control through a range of speeds are an expensive way of achieving the required control and are further known to radiate substantial radio frequency interference (RFI). Resistive voltage reduction circuits, on the other hand, may waste considerable power in the resistors.

The vehicles using such electric accessory motors generally use a combustion engine for primary motive power and further include an engine driven alternator for power of electric accessories. The alternator includes a three phase alternating current generator with a three phase, full wave bridge rectifier output circuit. Each phase winding of the generator is connected to the junction of a diode pair assigned to that phase, with the diode pairs connected in the bridge circuit to provide the full output voltage with a small ripple. A storage battery and voltage regulating circuit complete the standard system. All electric power for accessories is obtained from the system output, which comprises the junction of the bridge circuit output and storage battery. The alternator is capable of supplying a range of voltages with control of the alternator field current. However, the alternator output is controlled by the voltage regulator to a substantially constant voltage slightly greater than the desired storage battery voltage for the charging of the latter and is thus not variable for control of electric accessory motor speed.

SUMMARY OF THE INVENTION

It is therefore an object of this invention to provide a speed control for a vehicle mounted electric accessory motor capable of selective operation of the motor at a few predetermined speeds without using expensive, RFI generating chopper circuits or power wasting resistive voltage reduction.

This is accomplished by deriving power for the motor from different numbers of individual phases of the multiphase alternator in such a way as to produce a chopping effect on the voltage at a comparatively low frequency with a duty cycle, and therefore an average power to the motor, dependent on the number of phases used.

The speed control of this invention is used on a vehicle having a high reactance, multiphase alternator with a diode bridge rectifying output circuit for charging a battery to a voltage controlled by a voltage regulator and comprises first circuit means connecting one end of the motor armature winding to the ungrounded output terminal of the output circuit, second circuit means connecting the other end of the motor armature winding to the junctions of the diodes of each phase of the output circuit, the second circuit means comprising a plurality of switched rectifiers, each having an anode connected to the other end of the motor armature winding and a cathode connected to the junction of the diodes of one phase of the output circuit, and switch control means effective to provide a continuous activation signal to selected numbers of the switched rectifiers. The switched rectifiers may be silicon controlled rectifiers, with the activation comprising a continuous activating voltage applied to the control electrodes thereof.

The speed control should be carefully distinguished from the standard phase control type of output voltage control for a multiphase alternator, in which switched rectifiers in each phase of a bridge rectifier circuit are also controlled in order to control the voltage output. In that type of control all the rectifiers are activated on each cycle, but each is activated over only a continuously variable portion of its cycle. The result is a continuously variable output voltage, but at the cost of a more expensive control circuit and high RFI. The control of this invention, however, activates selected numbers of the diodes in the bridge circuit, but those that are activated are activated continuously, with voltage variation only by the number of phases thus used. The number of available voltages is very restricted, but the control circuit is inexpensive and generates substantially less RFI.

Further details and advantages will be apparent from the accompanying drawings and following description of a preferred embodiment.

DESCRIPTION OF THE PREFERRED EMBODIMENT

Figure 1:
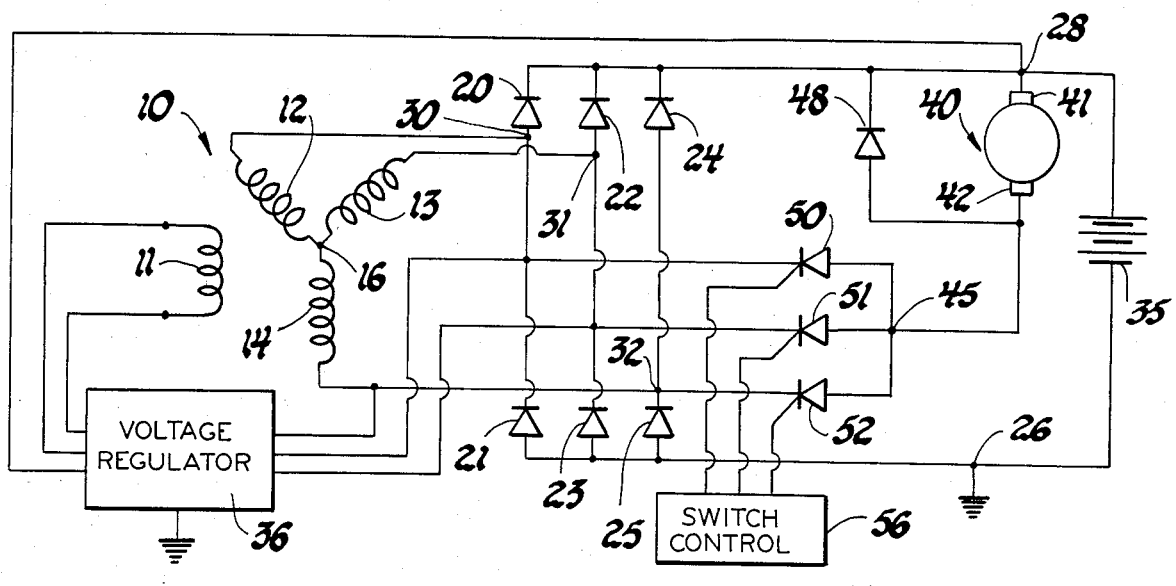
FIG. 1 shows a circuit diagram of a preferred embodiment of this invention.

Referring to FIG. 1, an alternator 10 includes a field winding 11 and three high reactance phase windings 12-14. Diodes 20-25 comprise a full wave, three phase, bridge rectifier output circuit, with the diodes connected in three parallel pairs of two series diodes each, 20-21, 22-23, and 24-25. The anodes of diodes 21, 23 and 25 are grounded at a ground terminal 26 of the output circuit; and the cathodes of diodes 20, 22 and 24 are connected at an ungrounded output terminal 28 of the output circuit. Windings 12-14 of alternator 10 each have one end connected in a common center junction 16; the other ends of windings 12-14 are connected to junctions 30-32, respectively, with junction 30 connecting the anode of diode 20 to the cathode of diode 21, junction 31 connecting the anode of diode 22 to the cathode of diode 23 and junction 32 connecting the anode of diode 24 to the cathode of diode 25. A battery 35 is connected between ground and output junction 28 of alternator 10. In addition, standard voltage regulator apparatus 36 regulates the output voltage of alternator 10 measured from junction 28 to ground in order to control the charging of battery 35. An example of such voltage regulator apparatus is described in the Harland Jr. et al U.S. Pat. No. 3,467,853 and issued on Sept. 16, 1969.

A DC motor 40 has a permanent magnet field and an armature winding with two end terminals 41, 42. Terminal 41 is connected to output junction 28 of alternator 10; and terminal 42 is connected to a junction 45 of the anodes of three switched rectifiers comprising silicon controlled rectifiers 50-52, having cathodes connected, respectively, to junctions 30, 31 and 32 of the bridge rectifier circuit. Each of Rectifiers 50–52 has a control electrode; and the control electrodes are connected to a switch control 56. A freewheeling diode 48 is connected around motor 35 in the standard manner.

Switch control 56 can take many forms. Its purpose is to supply, selectively, activating DC voltages to one, two or all three of the control electrodes of diodes 50–52. For example, a computer might include a control algorithm for determining desired fan speeds and outputs for selectively activating one, two or three output transistors, each of which provides an activating voltage to a respective one of the three control electrodes of diodes 50–52 only when it is itself activated. Manual switch means may alternatively be provided. As long as the operation of the switch means is in agreement with the description herein, many specific embodiments will occur to those skilled in the art, each having its own advantages in a particular situation.

Figure 2:
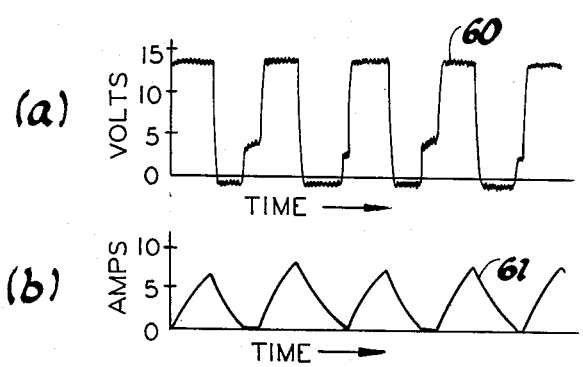
FIG. 2 shows a series of waveforms useful in understanding the operation of the circuit of FIG. 1.
Figure 2:
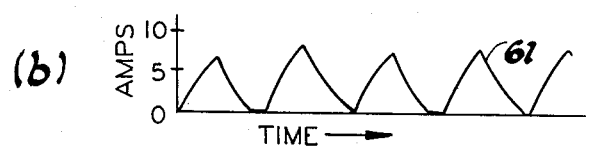
Figure 2:
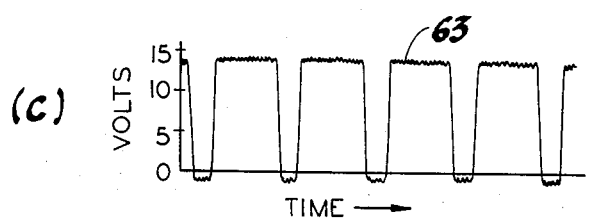
Figure 2:
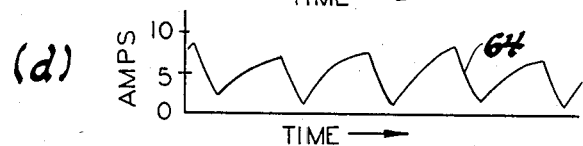
Figure 2:
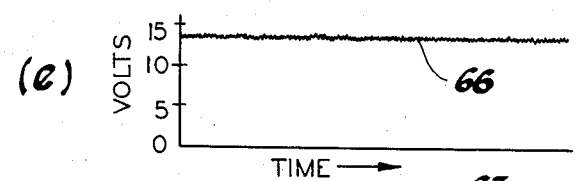
Figure 2:
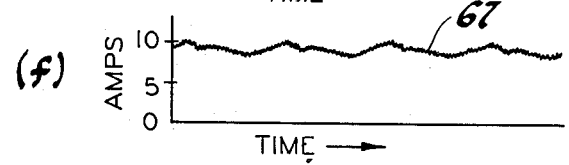

In operation, the armature of motor 40 receives no current if none of the diodes 50–52 is activated, although the remainder of the vehicle electrical system receives electrical power in the usual manner. When switch control 56 activates one of the diodes—diode 50, for example—the full wave rectified voltage of a single phase of alternator 10 is used by diode 50. However, the voltage wave, as measured across the armature terminals 41, 42 of motor 40, does not have the familiar sine wave configuration of the internal phase voltages of alternator 10 as seen in simplified, idealized descriptions of a simple AC generator, due to the high reactance of the phase windings and the effect of the charging battery and voltage regulator. Instead, it appears as in curve 60 of FIG. 2(a): an approximation of a rectangular wave. It has the appearance of a chopped voltage wave, even though the activating voltage to diode 50 is continuous. The motor armature current is shown in curve 61 of FIG. 2(b). In a test of the system with a cooling fan from a vehicle manufactured by the assignee of this invention, the system generated an average of 6.7 volts and 20 watts for a fan speed of 1170 rpm.

If a faster speed is desired, a second diode 51 is activated by switch control along with diode 50. Two phases of the alternator are now used, with the effect shown in curve 63 of FIG. 2(c): the voltage output is still a rectangular wave but the duty cycle has increased for an average voltage of 10.3 volts. The armature current is shown in curve 64 of FIG. 2(d) for an output power of 60 watts and a fan speed of 1700 rpm. Finally, if all three diodes 50–52 are activated by switch control 56, the result is shown in the voltage curve 66 and current curve 67 of FIGS. 2(e) and 2(f), respectively: a constant voltage curve of 14.3 volts and a substantially constant armature current for a power output of 130 watts and a fan speed of 2275 rpm.

With an automotive electrical accessory motor the system provides a duty cycle modulated rectangular voltage which provides several selectable output power levels and is useful in such systems as can accommodate those specific power levels. No undesirable motor or alternator behavior was observed in the test; and the RFI is considerably less than that generated by conventional choppers, partly because of the low frequency of switching compared to electronic choppers and partly because the output wave is not so sharply rectangular and thus generates fewer harmonics in the radio frequencies.

I claim:

1. A speed selection control for a DC electric accessory motor having an armature winding and being mounted on a vehicle having a high reactance, multiphase alternator with a diode bridge rectifying output circuit, a battery connected across the output circuit and a voltage regulator controlling the voltage across the output circuit to a substantially constant voltage, the speed control comprising in combination:

first circuit means connecting one end of the motor armature winding to the ungrounded end of the output circuit;

second circuit means connecting the other end of the motor armature winding to the output circuit only at the junctions of the diodes of each phase thereof, the second circuit means comprising a plurality of switched rectifiers, each having an anode connected to the other end of the motor armature winding and a cathode connected to the junction of the diodes of one phase of the output circuit; and switch control means effective to vary the speed of the motor by providing a continuous activation signal to selected numbers of the switched rectifiers, including at least one such number less than all and greater than none of the switched rectifiers, whereby the motor armature receives electric power from the alternator with voltage duty cycle controlled according to the number of switched rectifiers activated and thus the number of alternator phases used.

* * * * *